March 1, 1932. C. W. MARCELLIS 1,847,720

SPRING BELT TENSION ADJUSTER

Filed Sept. 10, 1928

INVENTOR
Carmen Wood Marcellis.
BY Adam E. Fisher.
ATTORNEY

Patented Mar. 1, 1932

1,847,720

UNITED STATES PATENT OFFICE

CARMEN WOOD MARCELLIS, OF KINGSTON, ONTARIO, CANADA

SPRING BELT TENSION ADJUSTER

Application filed September 10, 1928. Serial No 304,917.

This invention is a spring belt tension adjuster for the spring belts of motion picture cameras.

In all motion picture work the exposed film is wound on a take-up reel by means of a spring belt which will slip on the reel pulley to allow for the slower turning of the reel as it continues to fill up. The tighter the belt, the harder the camera will turn and the more difficult to do smooth and even cranking. It may be tight enough for all purposes at the beginning of a roll of film and the camera would then turn freely. When we get near the end of the roll, however, the drag is heavier and the movement of the reel slower and there is more or less constant slipping of the belt upon the pulley. In many cases and when least expected it stops winding up the exposed film and allows it to back up in the body of the camera and become entangled in the sprockets, making it necessary to open the camera, spoiling a number of feet of film and possibly making it necessary to retake the whole scene. In news reel work the event would be past with no opportunity for a retake.

At present, if the spring belt is seen to slip too freely, the operator has to stop the camera and cut a piece out of the spring belt and connect it together again. Nine out of ten times he does not detect this until too late. When he has cut out a piece and again connected it together, he is likely to find it will take up the film all right but he finds his camera turning very hard.

The object of the invention, therefore, is to provide a relatively simple, practical and durable device for regulating the tension on the spring belt take-up of motion picture cameras and the like mechanisms, and to make it possible for the cameraman to increase the tension on the spring belt gradually as the take-up reel gets heavy, and release that extra tension again when starting upon each new reel and to do this without stopping the camera motion.

In the drawings

Figure 1:
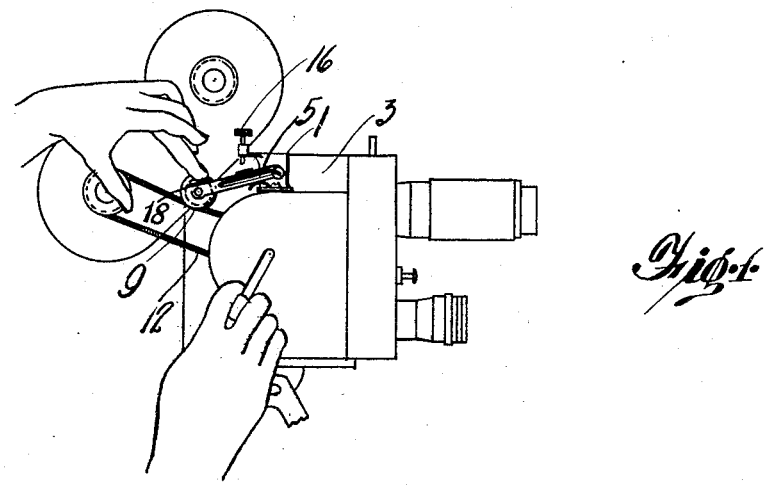
Figure 1 is a side elevation of the device as attached to a standard form of motion picture camera, and showing how the device may be manipulated by one hand while the reel is being operated by the other hand.
Figure 2:
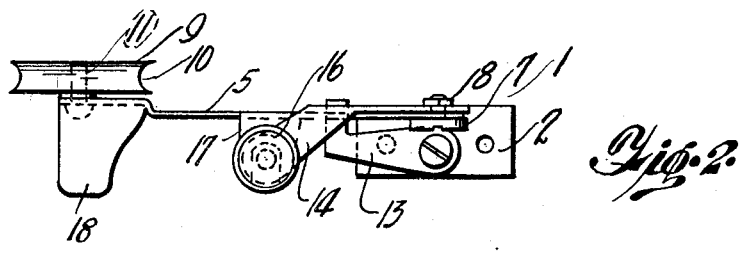
Figure 2 is an enlarged top plan view of the device alone.
Figure 3:
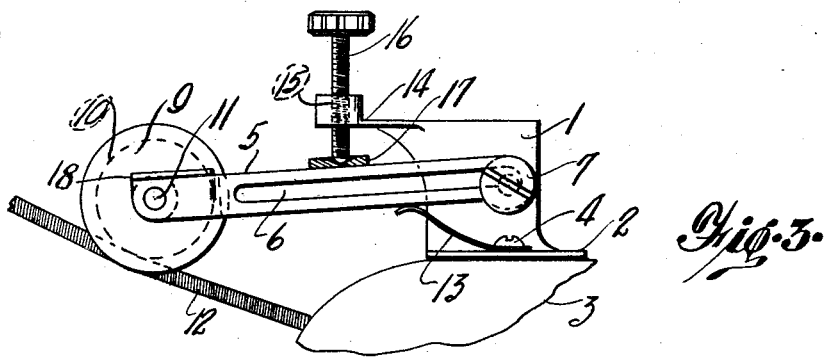
Figure 3 is an enlarged side elevation of the device as attached to a camera, a part only of the latter being shown, at the front point of attachment of the device.

The invention comprises a bracket 1 having a foot flange 2 whereby the bracket may be secured to the camera 3 by means of a set screw 4 or in any other convenient way. The shape of the bracket as here shown may be varied of course to meet the requirements of mounting the device upon different types of cameras. An elongated cam-arm or lever 5 having an elongated adjustment slot 6 is mounted upon the bracket 1 by passing a lock screw 7 through the said slot 6 of the arm 5, and through the bracket 1. A nut 8 upon the threaded end of the screw 7 retains same in place. A small roller 9 having a peripheral groove 10 is journaled upon a stud 11 extended from the bracket 1, and the alignment of the assembly is such that the roller 9 will bear upon the spring belt 12 of the camera 3, so that the belt is adapted to travel in the groove 10. A flat lift spring 13 having an end seated under the head of the screw 4 which passes through that end of the spring, supports at its upper end the arm 5 which bears upon the free end of the upbent spring. The bracket 1 has a screw-socket extension 14 which is threaded at 15 to engage the adjustment screw 16 which passes down therethrough and is adapted to bear upon the tab or ear 17 extended over the upper side of the arm 5.

In use, the belt 12 may be readily tightened or loosened by merely manipulating the adjustment screw 16 which in turn causes the roller 9 to bear with more or less emphasis upon the belt 12. When properly adjusted, the arm 5 is locked by tightening up the screw 7.

The device may be operated with the left hand while operating the camera with the right hand by pressing downward with the finger upon a finger piece 18 provided upon the outer end of the cam arm or lever 5 for this purpose, as shown in Figure 1. This may be desirable in an emergency, upon the sudden slackening or loosening of the belt during the process of taking pictures. When the device is not desired in use, it may be locked up out of the way and out of contact with the belt.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a motion picture camera including a belt as a part of its operating mechanism, a bracket, a foot flange on the bracket, whereby the bracket may be secured on the camera, an elongated cam arm having a longitudinal adjustment slot, a lock screw mounted on the bracket and passed through the slot in the cam arm, a roller journaled at the end of the cam arm in alignment with the said belt on the camera, a flat lift spring secured on the foot flange of the bracket and supporting the said cam arm, a screw socket extension on the bracket, a tab extended from the cam arm, an adjustment screw threaded through the screw socket extension and adapted to bear on the said tab, and a finger piece extended from the cam arm whereby the same may be pressed into engagement with the said belt on the camera.

In testimony whereof I affix my signature.

CARMEN WOOD MARCELLIS.